(12) United States Patent
Wobben

(10) Patent No.: US 7,313,469 B2
(45) Date of Patent: Dec. 25, 2007

(54) METHOD FOR SUPPLEMENTING AND CALCULATING ENERGY CONSUMED BY A VEHICLE

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 10/516,761

(22) PCT Filed: May 30, 2003

(86) PCT No.: PCT/EP03/05672

§ 371 (c)(1),
(2), (4) Date: Sep. 14, 2005

(87) PCT Pub. No.: WO03/104018

PCT Pub. Date: Dec. 18, 2003

(65) Prior Publication Data

US 2006/0100754 A1    May 11, 2006

(30) Foreign Application Priority Data

Jun. 5, 2002    (DE) ................................. 102 24 807

(51) Int. Cl.
*G06F 17/00* (2006.01)
(52) U.S. Cl. .............................. 701/22; 701/1; 701/33; 701/101; 180/65.3
(58) Field of Classification Search .................. 701/22, 701/33, 35, 103, 104; 180/65.3
See application file for complete search history.

(56) References Cited

U.S. PATENT DOCUMENTS

| | | | | |
|---|---|---|---|---|
| 4,315,562 A * | 2/1982 | Tangorra et al. | ............... | 185/37 |
| 5,272,431 A | 12/1993 | Nee | ............... | 320/2 |
| 5,998,963 A | 12/1999 | Aarseth | ............... | 320/109 |
| 6,166,449 A * | 12/2000 | Takaoka et al. | ............... | 290/40 B |
| 2003/0209375 A1 | 11/2003 | Suzuki et al. | ............... | 180/65.3 |

FOREIGN PATENT DOCUMENTS

| | | |
|---|---|---|
| DE | 2 259 505 | 6/1974 |
| DE | 42 29 687 A1 | 3/1994 |
| DE | 195 27 216 A1 | 1/1997 |
| DE | 195 35 294 A1 | 3/1997 |
| EP | 0 557 287 B1 | 3/1996 |

(Continued)

OTHER PUBLICATIONS

Mock, et al., "Catalysis by Cucurbituril. The Significance of Bound-Substrate Destabilization for Induced Triazole Formation", *J. Org. Chem.* 54: 5302-5308 (1989).

(Continued)

*Primary Examiner*—Gertrude A. Jeanglaude
(74) *Attorney, Agent, or Firm*—Seed IP Law Group PLLC

(57) ABSTRACT

A method for supplementing and calculating energy consumed by a vehicle. A system enables electrically operated vehicles to be provided with electrical energy within a limited time slot, and payment for the energy. A vehicle comprising a receiving area for a first energy accumulator, and is characterized in that e) the first energy accumulator is removed from the vehicle, f) a second energy accumulator having a preset level is introduced into the vehicle, g) the difference between the amount of energy in the first accumulator and in the second accumulator is determined, and h) a value indicating the difference is transmitted to a data acquisition device.

21 Claims, 5 Drawing Sheets

FOREIGN PATENT DOCUMENTS

| | | |
|---|---|---|
| FR | 2 685 547 | 6/1993 |
| FR | 2 716 228 | 8/1995 |
| GB | 2 353 151 A | 2/2001 |
| JP | 5-292608 | 11/1993 |
| JP | 6-48184 | 2/1994 |
| JP | 6-318288 | 11/1994 |
| JP | 7-39012 | 2/1995 |
| JP | 2001-57711 | 2/2001 |

OTHER PUBLICATIONS

Zanirato, P. "Reactivity of Aryl and Heteroaryl Azides with Vinylsilane and Alkynylsilane. Formation of C-Silylated 1,2,3-Triazolines and 1,2,3-Triazoles", *J. Chem. Soc. Perkin Trans. 1*: 2789-2796 (1991).

Padwa, A. "Intermolecular 1,3-Dipolar Cycloadditions", in *Comprehensive Organic Chemistry*; Trost, B.; ed.; pp. 1069-1109 (1991).

Hlasta, et al., "Steric Effects on the Regioselectivity of an Azide-Alkyne Dipolar Cycloaddition Reaction: The Synthesis of Human Leukocyte Elastase Inhibitors", *J. Org. Chem. 59*: 6184-6189 (1994).

Clarke, et al., "Preparation and pyrolysis of 1-(pyrazol-5-yl)-1,2,3-triazoles and related compounds", *J. Chem. Soc. Perkin Trans. 1*: 1799-1804 (1997).

Booth, et al., "Efficient Recognition-induced acceleration of a [3+2] dipolar cycloaddition reaction", *Tetrahedron Lett. 39*: 6987-6990 (1998).

Gothelf, et al., "Asymmetric 1,3-Dipolar Cycloaddition Reactions", *Chem. Rev. 98*: 863-909 (1998).

Saxon, et al., "Cell Surface Engineering by a Modified Staudinger Reaction", *Science 287*: 2007-2010 (2000).

Cao, et al., "Molecular Shuttles by the Protecting Group Approach", *J. Org. Chem. 65*: 1937-1946 (2000).

Schindler, S. "Reactivity of Copper(I) Complexes Towards Dioxygen", *Eur. J. Inorg. Chem.*: 2311-2326 (2000).

Kolb, et al., "Click Chemistry: Diverse Chemical Function from a Few Good Reactions", *Angew. Chem. Int. Ed. Engl. 40*: 2004-2021 (2001).

Kiick, et al., "Incorporation of azides into recombinant proteins for chemoselective modification by the Staudinger ligation", *Proc. Natl. Acad. Sci. USA 99*: 19-24 (2002).

Chen, et al., "Selectivity in an Encapsulated Cycloaddition Reaction", *Org. Lett. 4*: 327-329 (2002).

Lewis, et al., "Click Chemistry In Situ: Acetylcholinesterase as a Reaction Vessel for the Selective Assembly of a Femtomolar Inhibitor from an Array of Building Blocks", *Angew. Chem. Int. Ed. Engl. 41*: 1053-1057 (2002).

Tornøe, et al., "Peptidotriazoles on Solid Phase: [1,2,3]-Triazoles by Regiospecific Copper(I)-Catalyzed 1,3-Dipolar Cycloadditions of Terminal Alkynes to Azides", *J. Org. Chem. 67*: 3057-3064 (2002).

* cited by examiner

METHOD FOR SUPPLEMENTING AND CALCULATING ENERGY CONSUMED BY A VEHICLE

BACKGROUND OF THE INVENTION

1. Field of the Invention

The present disclosure pertains to a method for supplementing and calculating energy consumed by a vehicle.

2. Description of the Related Art

For every driver of a motor vehicle today it is a matter of routine to drive to a filling station to supplement its fuel supply and fill up its tank there. It is well known that, during the filling process, the amount of fuel flowing into the tank is detected and transmitted to a cashier for payment. Such a process runs with a variety of fuels that are used in the internal combustion engines, be they gasoline, diesel fuel, gas, etc.

Alongside the overwhelming number of motor vehicles with internal combustion engines, there is small but increasing number of vehicles with electric propulsion. The propulsion energy for these vehicles is stored in batteries or capacitors. Since batteries can be charged only with a preset maximum current, charging is accomplished in that after usage the vehicle is connected to a power source via a cable and is then charged with a preset maximum current, so that the vehicle is again available the next morning with fully charged batteries.

An electrical energy system is also known from EP 0 557 287 B1, which is incorporated herein by reference in its entirety.

BRIEF SUMMARY OF THE INVENTION

In one aspect, a vehicle comprises an energy accumulator having one or more batteries or capacitors. In another aspect, a unit for supplementing the energy supply of a vehicle comprises an access lane and at least one stopping position for vehicles.

In another aspect, a system permits provision of energy for electrically powered vehicles within a limited time slot, as well as payment therefor.

In another aspect, a method comprises:

a) removing a first energy accumulator from a vehicle, b) introducing a second energy accumulator with a preset level into the vehicle, c) determining the difference in the amount of energy between the first and the second accumulators, and d) transmitting a value indicating the difference to a data acquisition device.

In this data acquisition device, this value indicating the difference can be subjected to processing so that, for instance, a price for the difference in energy amount can be determined. By virtue of the exchange of the energy accumulator, the time required for the filling process (charging process) can be limited to the exchange process, since the second introduced energy accumulator can already be fully charged. Thus the time for "fueling" also remains limited to a time slot that is familiar to every driver today from a normal fueling process. This will increase acceptance of such a system.

Furthermore, the range of a vehicle can be extended (temporarily if desired) by introducing an accumulator with higher capacity. Alternatively, by means of such an exchange an accumulator charged overnight with cheap nighttime power at a home terminal can be removed and replaced by one with an amount of energy sufficing only for the day, if only a short distance is to be traveled. Here too, a difference (in favor of the customer) can be determined and an amount can thus be credited or paid out.

The full accumulator with cheap nighttime power can be used, for instance, to support the grid during the afternoon peak time. Thus the power bought cheaply at night can be sold during this peak time at a higher price.

To help assure that the energy accumulators introduced into a vehicle operate reliably and do not lead to a (premature) failure of the vehicle, every energy accumulator may be subjected to a function test and/or one or more additional tests prior to the charging process.

To make the test results traceable, predetermined data from the test or tests may be stored. This storage can be accomplished, for example, by means of a written entry in an accompanying booklet or on a plaque on the accumulator. Additionally or alternatively, the accumulator can also be equipped with a chip to store this data and output it if needed.

In another aspect, energy withdrawal from the second accumulator may be prevented after the exchanging of the energy accumulator and/or a drive-away inhibition may prevent driving the vehicle away, and energy withdrawal or driving away may be enabled by the data acquisition device via a signal. In this way, "fuel theft" may be effectively prevented if such enabling does not take place until, for example, the price for the new accumulator has been paid.

In order to give the driver or the person who is waiting an overview of the energy consumption of the vehicle, the data related to the consumption can be acquired and transmitted to the data acquisition device. This may be, for instance, the distance driven, the power output of the vehicle, temperature data, and/or other data.

In another aspect, an energy accumulator may have an unambiguous marking and/or standardized terminals and/or a standardized shape. By virtue of an unambiguous marking, in the form, for instance, of a glued-on plaque, an electronic chip, an engraved number or the like, an unambiguous identification or tracking of the energy accumulator is possible. By virtue of the standardized terminals, usage of an energy accumulator is possible in every vehicle with appropriate terminals. An energy accumulator with standardized terminals can additionally be gauged at any standard site and charged at any suitable charging station. To permit standardized and preferably automated handling of the energy accumulator during removal from the vehicle and introduction into the vehicle, the invented energy accumulator may also have a standardized shape.

In another aspect, the energy accumulator is characterized by at least one holding device, on which can be placed an exchangeable molded element that fits into the outer shell of the vehicle. The same accumulator can thereby be used for different vehicle models. The opening provided in the vehicle for exchanging accumulators is then covered by a molded element that is constructed specifically for the vehicle or model, and is fastened onto the energy accumulator by appropriate fastening means. Of course, the color can also be matched in this manner.

In order to facilitate an exchange of the energy accumulator in different vehicle orientations, the accumulator may, in some embodiments, be accessible from at least one side of the vehicle and/or from the bottom of the vehicle. Access openings on both long sides of the vehicle thus facilitate an exchange of the energy accumulator at the side, without requiring a particularly precise orientation of the vehicle.

In another aspect, a container is provided that has essentially the cross section of the energy accumulator and a holding device for an exchangeable molded element, and can be introduced into the space not required by the energy accumulator. The vehicle has a channel having essentially the cross section of the energy accumulator over its entire width, which facilitates exchanging the battery from different sides of the vehicle. The space in this channel that is not required by the energy accumulator can be used, for instance, as additional storage space for tools and/or a warning light and/or a first-aid kit. Depending on the position of this storage space in the vehicle, these parts may be in a better position there than if they were accommodated in the trunk.

In another aspect, a vehicle comprises a label that indicates the vehicle model and/or the position of the energy accumulator. This label can be analyzed and the position of the energy accumulator, its capacity and additional parameters can be deduced. This label can be constructed in the form of a marking placed on the vehicle, as a plug connector, or as a device that, for instance, transmits an appropriate response signal to a wireless query.

In another aspect, a unit of the type mentioned above comprises at least one device for carrying away the first energy accumulator and for supplying the second, filled energy accumulator. Thereby the testing and/or charging of the energy accumulator that has been removed from the vehicle can be done at a different place, such as in a central area, and only the first energy accumulator that has been removed from the vehicle and the second energy accumulator to be introduced into the vehicle are present at the respective stopping position of the vehicle.

In another aspect, a unit comprises a device for acquiring the vehicle model. This detecting can be accomplished by, for instance, imaging methods (camera), a manual input by way of, for instance, a keyboard, a wireless query, or in some other suitable manner, and the position of the energy accumulator in the vehicle, for instance, can thereby be made known to the unit.

In another aspect, to shorten the transport times of the individual energy accumulators as much as possible when they are needed, it is possible for a main storage area and an interim storage area to be provided in the vicinity of at least one vehicle stopping position, in addition to a (central) unit for testing and refilling energy accumulators removed from vehicles. Energy accumulators removed from the vehicle can thus be supplied to the unit for testing and refilling. There they will be tested and recharged and supplied, for instance, to a main storage area. From this main storage area, the energy accumulators now ready for distribution are supplied to smaller interim storage areas at, for instance, the vehicle stopping positions, so that a number of charged and tested energy accumulators is available there. As soon as an accumulator exchange is to take place for a vehicle, a tested and charged accumulator is already available in the vicinity and can be quickly installed, so that the exchange process is accomplished with appropriate speed.

In order to free people from the hard physical labor of exchanging energy accumulators, on the one hand, and on the other hand to reduce the risk of errors, a unit may comprise at least one device for the automatic exchange of energy accumulators.

In order to have a clearly defined position in which the energy accumulator is exchanged, independent of vehicle type, the vehicle stopping position may be situated on a transport device that transports the vehicle past various working positions.

In another aspect, a unit can be integrated with a conventional filling station. To facilitate an optimally unimpeded approach and drive-off for such a unit, it is possible to provide transport means for the energy accumulators that are preferably at least partially subterranean to transport the accumulators between individual storage places and work stations.

BRIEF DESCRIPTION OF THE SEVERAL VIEWS OF THE DRAWINGS

The invention is explained in greater detail below on the basis of figures. Shown therein are.

DETAILED DESCRIPTION OF THE INVENTION

Figure 1:
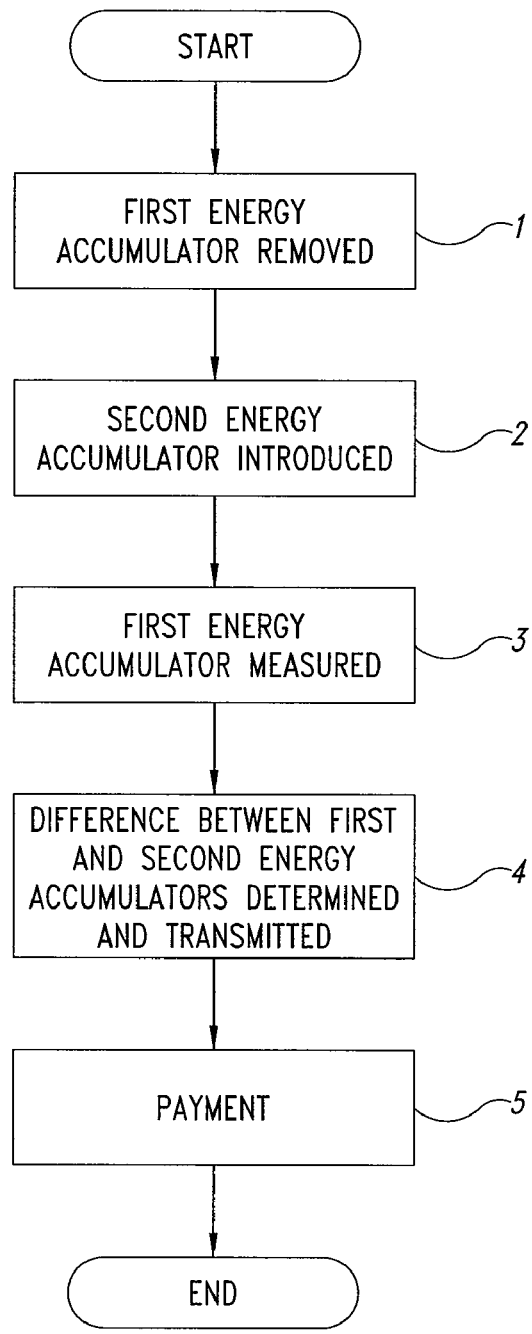
FIG. 1, an embodiment of a method according to the invention in a flow chart.

An embodiment of the method for supplementing the energy supply for an electric vehicle is illustrated in FIG. 1. In step 1, the first energy accumulator is removed from the vehicle; in step 2, a second, charged energy accumulator is introduced; in step 3, the first energy accumulator is measured. This measurement pertains to the amount of energy still contained in the energy accumulator. Since the amount of energy contained in the second, introduced, energy accumulator is known, the difference can easily be determined (step 4) and paid for (step 5). It is immaterial in this respect whether the two accumulators differ in capacity. Thus a special, and thus heavier, accumulator with higher capacity can be used when desired, and the range of the vehicle can thereby be expanded. Alternatively, a lighter accumulator of lesser capacity with correspondingly reduced but sufficient range can be used.

Figure 2:
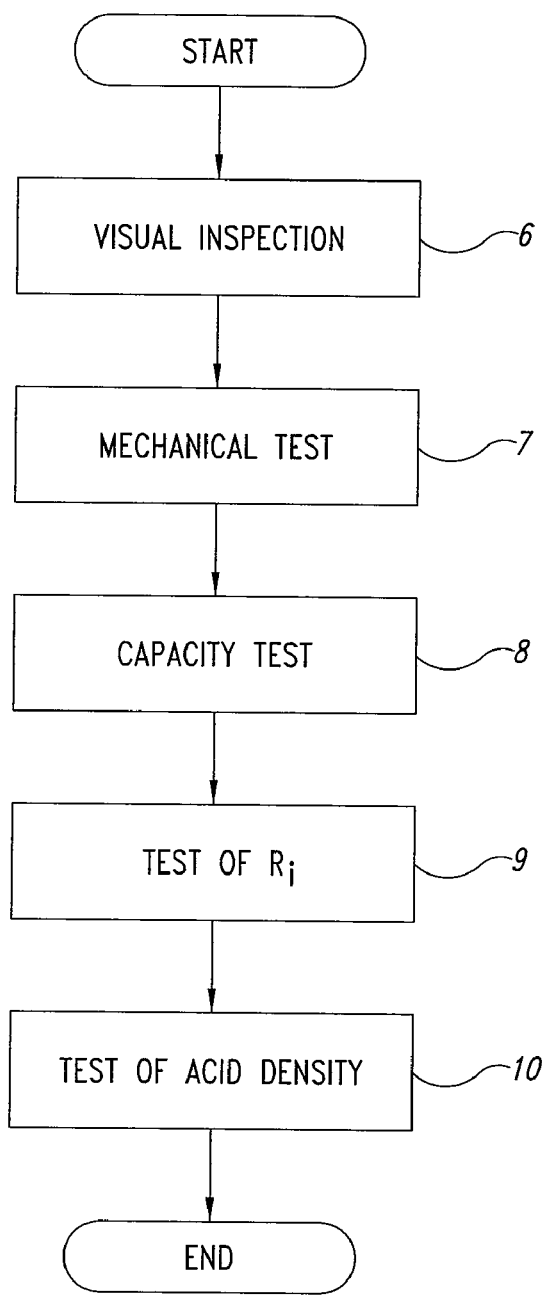
FIG. 2, a flowchart in which various tests are illustrated.

As soon as the accumulator has been removed from the vehicle and the amount of energy remaining in the accumulator has been determined, the accumulator can be subjected to an additional testing process to ensure that only technically acceptable accumulators are recharged and reused, as illustrated in FIG. 2. Such tests may comprise, for example, a visual inspection (step 6) in which external damage, deformations and so on can be determined. A mechanical test (step 7) that provides information on, for example, dimensional stability, firm seating of terminals and the like can also be carried out. Additionally conceivable, for example, are a capacity test (step 8), a test of internal resistance (step 9), and a test of acid density (step 10). From the outcomes of these tests, and possibly additional ones as well, the condition and presumed remaining service life of the energy accumulator can be deduced. Thus it can be assured that only an acceptable accumulator is recharged and inserted into an automobile. A failure of the vehicle as a result of a defective battery can thus be avoided with some degree of certainty.

Figure 3:
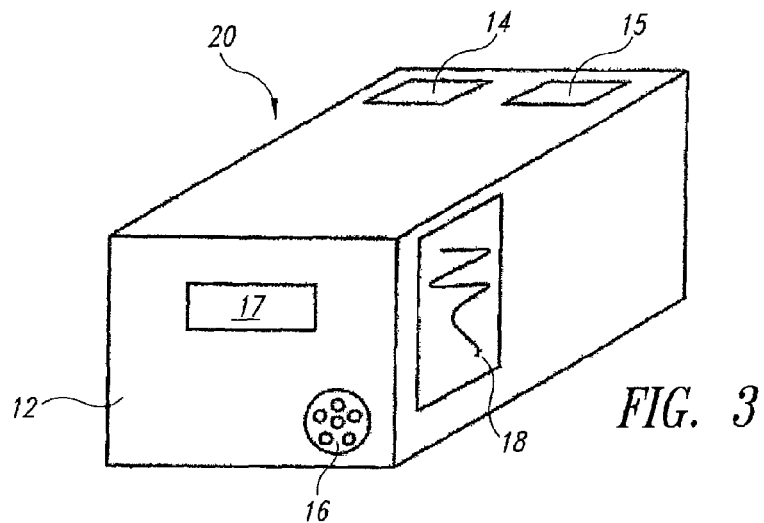
FIG. 3, an embodiment of an energy accumulator according to the invention.

FIG. 3 schematically shows an example embodiment of an energy accumulator according to the invention. This accumulator has a housing 12. In or on this housing, there are electrodes 14,15 in the form, for instance, of plates. These plates have a cross section that is sufficient to conduct the current necessary for operating the vehicle. Also provided is a plug connector 16, via which statistical and/or dynamic measurement parameters can be determined. Here, cell voltages, internal resistances, etc., can be considered. Additionally, a label 17 is provided. This label 17 enables an unambiguous identification of the energy accumulator, designated overall by the reference number 20. If this label 17, in the form, for example, of a plaque, is placed on the front side of energy accumulator 20 and offers sufficient space, additional data such as measurement results or the like can be entered there. Also illustrated is a pocket 18, in which measurement protocols, for instance, can be preserved so that they always accompany energy accumulator 20. Alternatively or additionally, of course, characteristics and/or measurement results and/or other relevant data can be deposited in an electronic memory (not shown) that can be integrated into energy accumulator 20.

Figure 4:
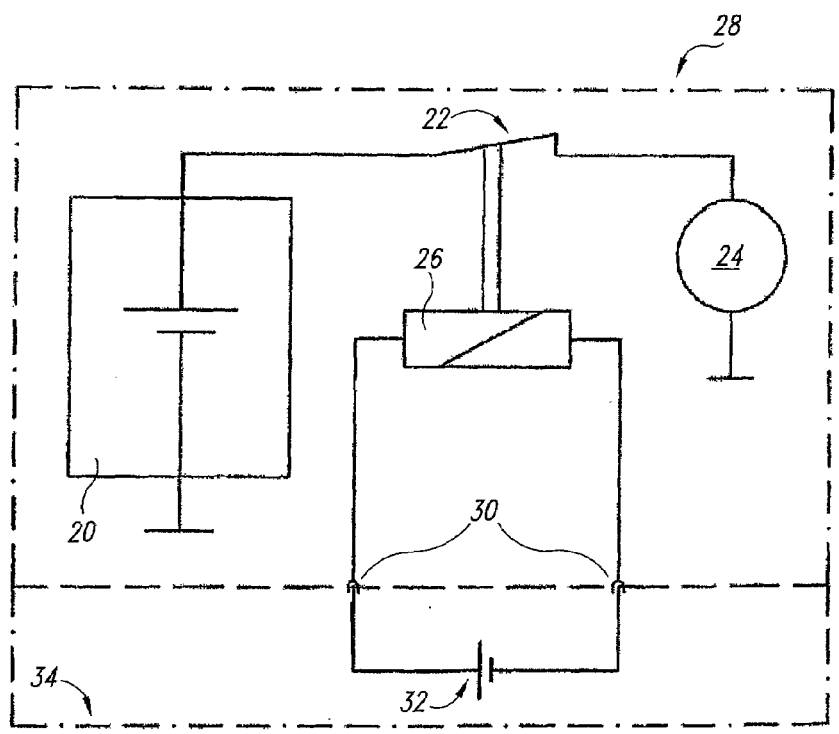
FIG. 4, an embodiment of a circuit for releasing the accumulator.

FIG. 4 shows a simplified example of a drive-away inhibition. It is divided into two parts. One part, with reference numeral 28, is associated with the vehicle, while the other part, with reference number 34, is associated with the filling station. Part 28, arranged in the vehicle, comprises energy accumulator 20, one (or more) contacts 22, and a motor 24. Energy accumulator 20, contact 22 and motor 24 are connected in series. Contact 22 must therefore be closed for energy accumulator 20 to provide power to motor 24. Contact 22 is actuated via, for example, a relay 26. This relay 26 receives power from a remote power source 32 via plug connector 30. Therefore, when power is applied to relay 26, contact 22 opens and interrupts the circuit between energy accumulator 20 and motor 24.

In this way, the energy accumulator 20 can be securely switched free of any load. After the exchange of accumulator 20 and payment for the supplemented amount of energy, the connection between power source 32 and relay 26 can again be interrupted. Thereby, relay 26 is de-excited, the contact closes and motor 24 can be supplied with power from energy accumulator 20.

Other embodiments are, of course, also conceivable, Thus, for instance, relay 26 can be driven as a function of the signal of a radio receiver. In this way, the release of the energy supply for motor 24, i.e., the closing of contact 22, can be automatically linked with the payment process. As soon as the payment process is concluded, i.e., as soon as the supplemented energy supply has been paid for, the flow of power from energy accumulator 20 to motor 24 can be released. On the other hand, this means that the vehicle cannot be moved as long as contact 22 is not closed, i.e., as long as power supply for the motor 24 has not been released. A "fuel theft" is thus prevented.

Figure 5:
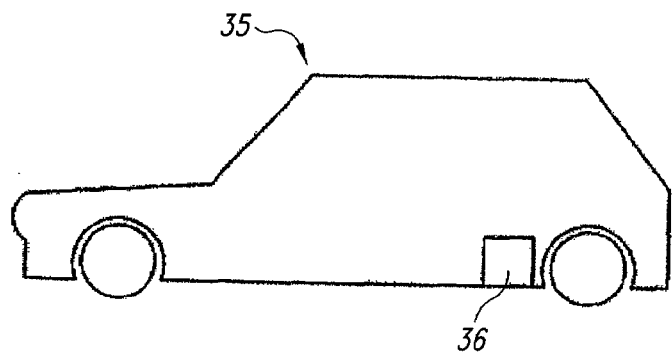
FIG. 5, a simplified side view of an embodiment of a vehicle according to the invention.

FIG. 5 schematically shows an example of a vehicle according to an embodiment of the invention 35. In this vehicle 35 the installation site for the energy accumulator is labeled with the reference number 36. Here an exchange from the side comes into consideration. However, an exchange from the vehicle bottom can also occur if an appropriate access opening is provided. Of course, a corresponding access possibility can also be provided on the other side of the vehicle for exchanging the energy accumulator (not shown in this figure).

Figure 6:
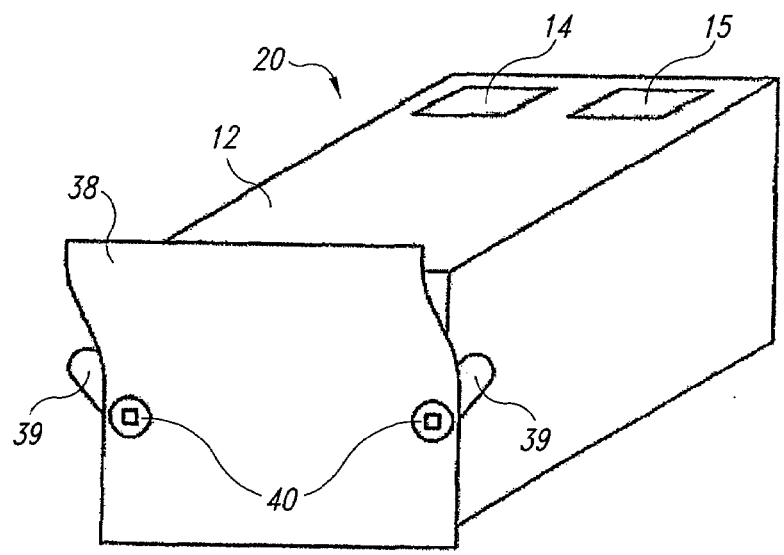
FIG. 6, a view of an embodiment of an energy accumulator according to the invention.

In FIG. 6, an embodiment of an energy accumulator 20 is again schematically represented. In this case a molded panel 38 on the front side of energy accumulator housing 12 is also shown. This molded panel 38 is tightly but detachably affixed to energy accumulator 20. If the energy accumulator 20 is introduced into the vehicle from the side, this access opening (reference number 36 in FIG. 5) can be closed off by molded panel 38. This closure can be joined to the vehicle by means of simple bars 39 moved by square sockets 40. Molded panel 38 is also constructed such that it fits into the external shape of the vehicle as smoothly as possible and has the same color as the vehicle. This molded panel 38 need not absolutely be joined to the energy accumulator, because its essential function is that of an inconspicuous closure for the access opening in the body of the vehicle.

Figure 7:
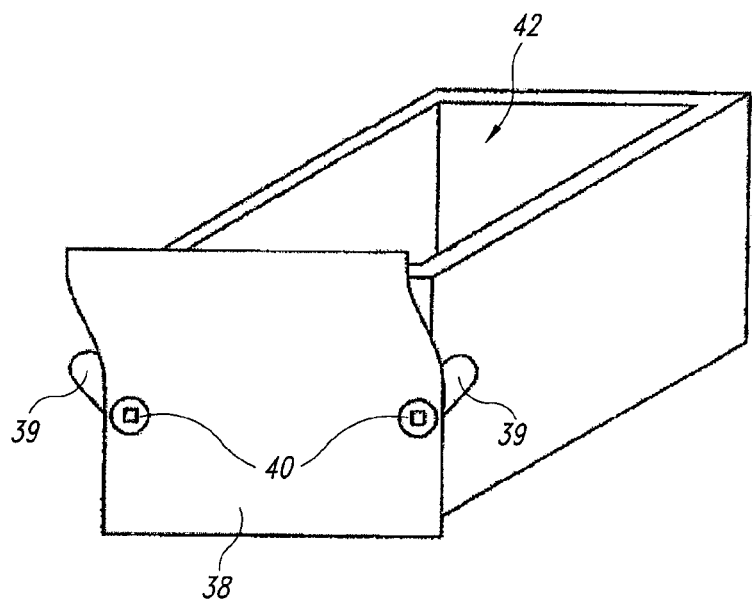
FIG. 7, an embodiment of a storage compartment insert.

If an exchange of the energy accumulator 20 on each of the long sides of the vehicle 35 is possible, then a type of tunnel runs inside the vehicle. So long as this tunnel is not completely filled up by the energy accumulator 20, the remaining space can be used, for example, as storage space. To that end, a container 42, illustrated in FIG. 7, that is introduced into this storage space can be provided. This access opening can also be closed off with a molded panel already illustrated in FIG. 6. Of course, other types of locking means, such as undercuts, snap fittings, threaded fittings or the like for fastening molded panel 38 and for connection to the vehicle body are also possible.

Figure 8:
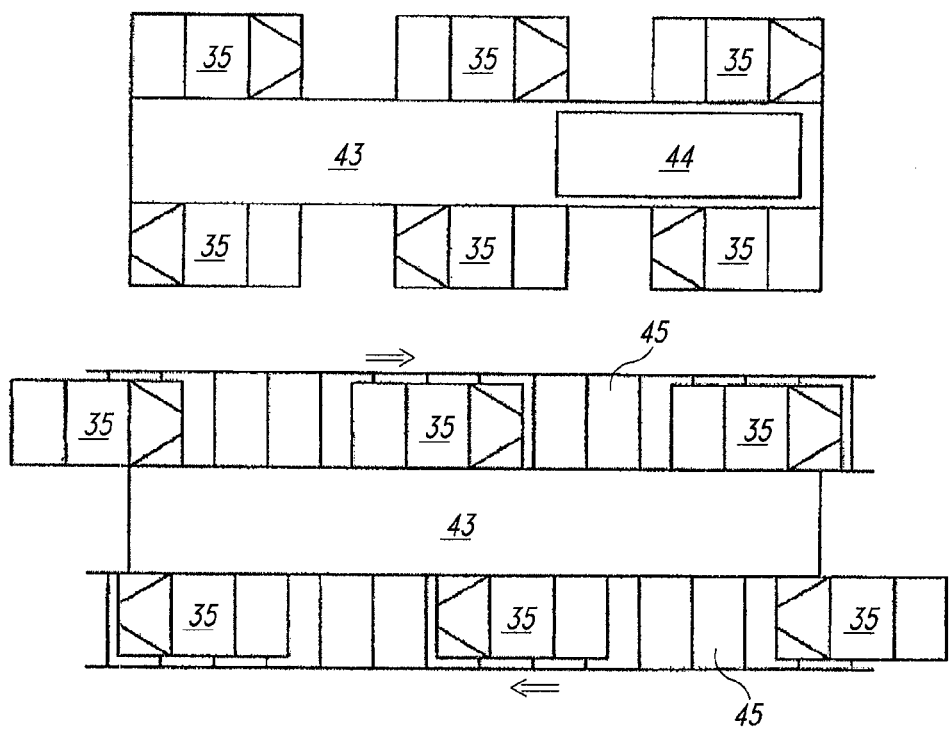
FIG. 8, an embodiment of a unit according to the invention for supplementing the energy supply.

FIG. 8 schematically shows an embodiment of a unit for supplementing the energy supply. Such a unit can also be a conventional filling station that is integrated with the appropriate means for exchanging the energy accumulators (see energy accumulator 20 of FIG. 3). A minimum separation must be provided, however, between a conventional gasoline pump and a station for exchanging energy accumulators 20. This separation ensures that, even if spilled or evaporated fuel at a conventional gasoline pump forms an appropriate mixture with the air, a spark (such as a breaking spark (arc)) occurring in the exchange of energy accumulator 20 does not ignite this mixture.

Several stopping positions for vehicles 35 are provided in this unit. Conventional gasoline pumps 44, from which a tank can be filled with fuel, may be provided at these stopping positions.

At other stopping positions, energy accumulators 20 can be exchanged. These positions may be provided on both sides of an island 43.

In the upper part of the drawing, the vehicles 35 are always at the same position next to the island. In the lower part of the drawing, an additional island 43 is illustrated, on the long sides of which transport belts 45 run. Here vehicles 35 are driven into, for example, wheel holders (not shown) and then transported by transport belt 45 continuously or discontinuously along island 43 at a preset speed. In this way, the vehicles 35 can be moved past predetermined work stations. At a first station, for instance, the energy accumulator located in vehicle 35 can be removed, and at a second work station the new energy accumulator is introduced into vehicle 35.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for supplementing and calculating energy consumed by a vehicle comprising a receiving area for a first energy accumulator, the method comprising:

a) removing a first energy accumulator from a vehicle;

b) introducing a second energy accumulator with a preset energy level into the vehicle;

c) determining a difference in an amount of energy in the first and in the second accumulator;

d) transmitting a value indicating the difference to a data acquisition device;

e) inhibiting withdrawal of energy from the second energy accumulator and/or a vehicle drive-away; and f) releasing the energy withdrawal and/or drive-away inhibition via a signal.

2. The method according to claim 1, further comprising:
subjecting the first energy accumulator removed from the vehicle to a function test and/or several additional tests before a recharging process.

3. The method according to claim 1, further comprising storing preset data from a test on or in one of the energy accumulators.

4. The method according to claim 1 wherein the signal is a radio signal.

5. The method according to claim 1, wherein data related to consumption is detected and transmitted to the data acquisition device.

6. An electric vehicle for operation with an energy accumulator, comprising one or more batteries or capacitors, characterized by an unambiguous label and/or standardized terminals and/or a standardized shape, the energy accumulator being accessible on at least one vehicle side and/or from a vehicle bottom, and in that the label indicates the vehicle type and/or the position of energy accumulator, and in that accumulator is exchangeable with another accumulator and wherein the vehicle comprises a drive-away inhibition circuit configured to inhibit a withdrawal of energy from the accumulator after an exchange and to release the inhibition in response to a signal from an accumulator exchange station.

7. The vehicle according to claim 6, further comprising a container having essentially a cross section of the energy accumulator and/or a retaining device for an exchangeable molded element.

8. The vehicle according to claim 6 wherein the label indicates data related to testing of the energy accumulator.

9. A unit for supplementing an energy supply, comprising:
an access lane;
at least one stopping position for a vehicle;
at least one device for transporting a first energy accumulator away from and supplying a filled second energy accumulator to the stopping position;
a transport device that transports the vehicle past various work positions; and
a data acquisition device configured to:
store an indication of a difference in an amount of energy in the first energy accumulator and in the second energy accumulator;
inhibit withdrawal of energy from the second energy accumulator by activating a circuit in the vehicle; and release the inhibition by transmitting a signal to the vehicle.

10. The unit according to claim 9, further comprising:
a device for detecting a vehicle model.

11. The unit according to claim 9, further comprising:
a unit for testing and filling the first energy accumulator that has been removed from the vehicle.

12. The unit according to claim 9, further comprising:
at least one main and one interim storage area for filled energy accumulators in the vicinity of the vehicle stopping position.

13. The unit according to claim 9, further comprising:
at least one device for automatic exchange of energy accumulators.

14. The unit according to claim 9, wherein the transport device transports vehicle sequentially past various work positions.

15. The unit according to claim 9, further comprising:
an at least partially subterranean transport means for energy accumulators to transport accumulators between individual storage areas or work stations.

16. The unit according to claim 9 wherein the unit is integrated with a conventional filling station.

17. A method of replacing an energy accumulator in a vehicle, the method comprising:
removing from a vehicle a first energy accumulator storing a first amount of energy;
disabling the vehicle;
installing in the vehicle a second energy accumulator storing a second amount of energy;
determining a difference between the first amount of energy and the second amount of energy; and
enabling the vehicle.

18. The method of claim 17 wherein disabling the vehicle occurs prior to removal of the first energy accumulator.

19. The method of claim 17 wherein disabling the vehicle occurs when the second energy accumulator is installed.

20. The method of claim 17, further comprising:
receiving a payment corresponding to the determined difference, wherein enabling of the vehicle occurs after the payment is received.

21. An energy accumulator exchange station, comprising:
means for removing a first energy accumulator storing a first amount of energy and installing a second energy accumulator storing a second amount of energy;
means for determining an amount of compensation due based on a difference between the first amount of energy and the second amount of energy; and
means for inhibiting theft of energy from the second energy accumulator.

* * * * *